D. SMITH.
Cotton-Presses.

No. 156,182. Patented Oct. 20, 1874.

WITNESSES.
J. P. Theodore Lang
C. L. Evers

INVENTOR
Duncan Smith,
By Alexander Amaton
Attorneys.

UNITED STATES PATENT OFFICE.

DUNCAN SMITH, OF MACON, GEORGIA.

IMPROVEMENT IN COTTON-PRESSES.

Specification forming part of Letters Patent No. 156,182, dated October 20, 1874; application filed April 10, 1874.

*To all whom it may concern:*

Be it known that I, DUNCAN SMITH, of Macon, in the county of Bibb and in the State of Georgia, have invented certain new and useful Improvements in Cotton-Presses; and do hereby declare that the following is a full, clear, and exact description thereof, reference being had to the accompanying drawings, and to the letters of reference marked thereon, making a part of this specification.

My invention relates to improvements in cotton-presses; and it consists of a screw rigidly attached to the piston of the press, and of a rotary nut having a set of anti-friction rollers radially arranged between it and its top bearing, the said anti-friction rollers being of conical shape, with a central bead, which, in connection with an annular groove in the bottom and top bearings, serves to keep the said rollers in the proper distance from the center of the screw. An annular bearing-frame, with radially-arranged journal-bearings, rests on the journal-ends of each of the said rollers, thereby preventing them from abandoning their radial positions.

In order to enable others skilled in the art to which my invention appertains to make and use the same, I will now proceed to describe its construction and operation, referring to the annexed drawings, in which—

Figure 2:
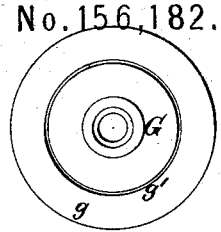
Figure 1:
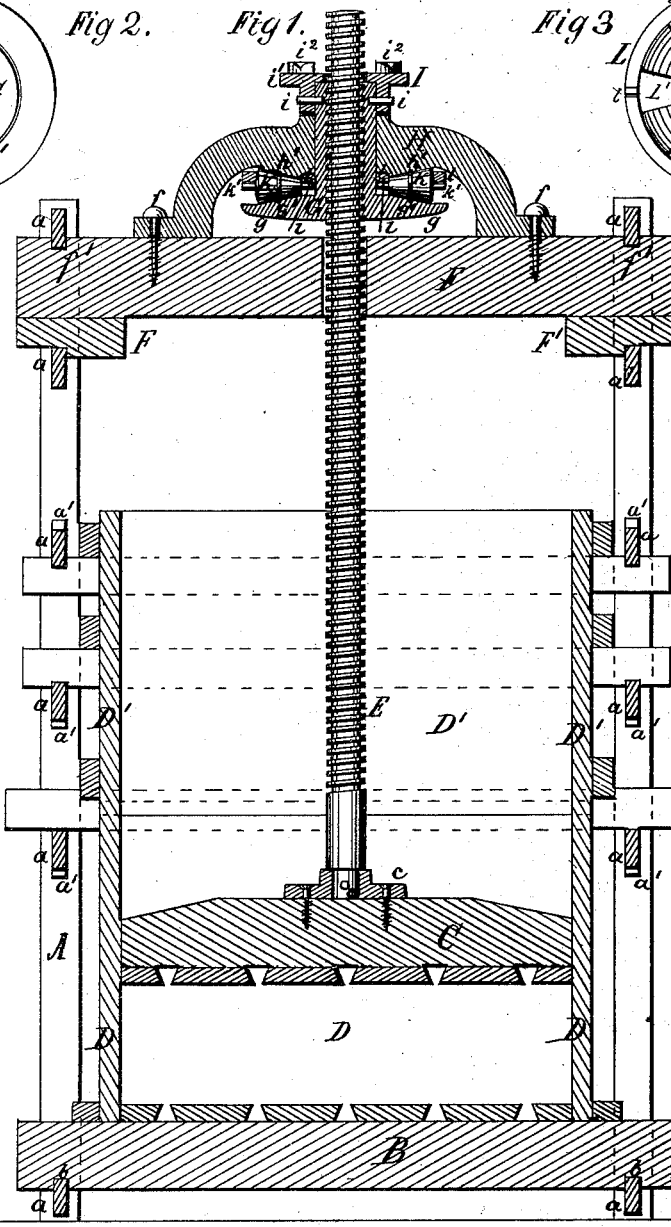
Figure 3:
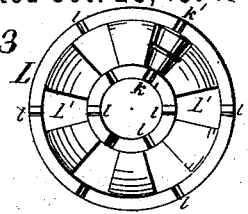
Figure 4:
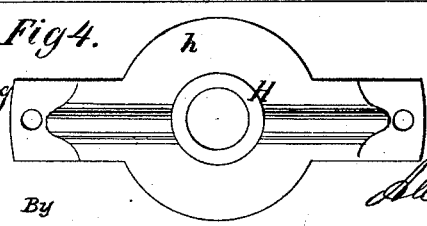

Figure 1 is a vertical central section; Fig. 2, a top view of the rotary nut; Fig. 3, a bottom view of the annular bearing-frame, exhibiting the radial journal-bearings; Fig. 4, a plan view of the top bearing.

A represents the upright rods or posts, which, in connection with horizontal rods $a$, fastened to the posts A, through which they are passed, by means of wedges $a'$, constitute the frame of the press. The bottom plate B rests on the lower horizontal rods $a$, and is provided with grooves $b$, to prevent the said rods from changing their position. The piston C slides in a box composed of the lower removable boards D and the upper rigid boards D', arranged in ordinary manner. The screw E is, by means of a foot-plate, $c$, and a pin, $e$, or a key, fastened to the piston C, and passes through the top F of the press into the rotary nut G, which is supported in the cylindrical bearing of the stand H by the cap I and the coupling-pins $i$. The lower end of the nut G forms a flange, $g$, and the stand H is provided with a similar flange, $h$. The opposite surfaces of the said flanges are conical, and each of them is provided with an annular groove, $g'$ and $h'$, of the same diameter, forming a fixed orbit for the beads $k$ of the conical rollers K, which are caused by the revolution of the nut G to travel around between the surfaces of the said flanges, and thus, by sustaining the pressure of the nut, convert the direct friction of the old construction into rolling friction. The rollers K are provided at their ends with journals $k'$, which are kept in radial position by the bearings $l'$ in the raised rims $l$ of the annular plate L. The said plate L is provided with apertures L' large enough to allow the rollers K to turn freely within them, the rims $l$ preventing the longitudinal movement of the rollers. The top F of the press, to which the stand H is fastened by screws $f$, is secured between the upper two cross-bars $a$, by means of the grooves $f'$ and wedges F, in the usual manner. The cap I is provided with a flange, $i^1$, and lugs $i^2$ for the insertion of beams or couplings, by which power may be applied.

Having thus fully described my invention, what I claim as new, and desire to secure by Letters Patent, is—

The combination of the frame L, having radial journal-bearings $l$, the journals $k'$, the rollers K, and the flanges $g$ and $h$, formed on the nut G and stand H, respectively, and the screw-spindle E, attached to the follower of a press, constructed and operated substantially as and for the purpose set forth.

In testimony that I claim the foregoing I have hereunto set my hand this 12th day of March, 1874.

DUNCAN SMITH.

Witnesses:
C. L. EVERT,
E. H. HARMAN.